United States Patent [19]
Argoudelis et al.

[11] 3,764,672
[45] Oct. 9, 1973

[54] COMPOSITION AND PROCESS OF TREATMENT USING LINCOMYCIN DERIVATIVES

[75] Inventors: Alexander D. Argoudelis, Portage; Brian Bannister, Kalamazoo; Fred Kagan, Kalamazoo; Barney J. Magerlein, Kalamazoo, all of Mich.

[73] Assignee: The Upjohn Company, Kalamazoo, Mich.

[22] Filed: Feb. 4, 1972

[21] Appl. No.: 223,756

Related U.S. Application Data

[63] Continuation-in-part of Ser. No. 56,238, Feb. 16, 1970, abandoned, which is a continuation of Ser. No. 833,860, June 2, 1967, abandoned, which is a continuation of Ser. No. 731,683, May 17, 1968, abandoned, which is a continuation of Ser. No. 628,541, April 5, 1967, abandoned, Continuation-in-part of Ser. No. 506,128, Nov. 2, 1965, abandoned, which is a continuation-in-part of Ser. Nos. 387,776, Aug. 4, 1964, Pat. No. 3,366,624, and Ser. No. 463,934, June 4, 1965, Pat. No. 3,380,992.

[52] U.S. Cl. .............................................. 424/181
[51] Int. Cl. ............................................. A61k 21/00
[58] Field of Search................. 424/181; 260/210 R

[56] References Cited
UNITED STATES PATENTS
3,380,992  4/1968  Argoudelis et al.............. 260/210 R OTHER PUBLICATIONS
R. Magerlein et al., Antimicrobial and Chemotherapy - 1966, 1967 - pages 727-736.

Primary Examiner—Jerome D. Goldberg
Attorney—John J. Killinger et al.

[57] ABSTRACT

Compounds having the formula

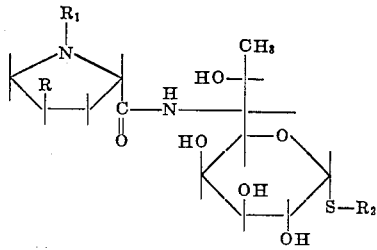

wherein R is alkyl of four, five, or six carbon atoms, $R_1$ is methyl or ethyl, and $R_2$ is methyl or ethyl in combination with a pharmaceutical carrier.

6 Claims, No Drawings

COMPOSITION AND PROCESS OF TREATMENT USING LINCOMYCIN DERIVATIVES

CROSS REFERENCES TO RELATED APPLICATIONS

This application is a continuation-in-part of application Ser. No. 56,238, filed July 16, 1970, (now abandoned) which in turn is a streamlined continuation of application Ser. No. 833,860, filed June 2, 1967 (now abandoned), which in turn is a streamlined continuation of application Ser. No. 731,683, filed May 17, 1968 (now abandoned), which in turn is a streamlined continuation of application Ser. No. 628,541 (now abandoned), which in turn is a continuation-in-part of application Ser. No. 506,128, filed Nov. 2, 1965 (now abandoned), which in turn is a continuation-in-part of application Ser. No. 387,776, filed Aug. 4, 1964, now U. S. Pat. No. 3,366,624 and application Ser. No. 463,934, filed June 4, 1965, now U. S. Pat. No. 3,380,992.

BRIEF SUMMARY OF THE INVENTION

This application related to novel compositions and process of treatment and more particularly to compositions comprising, in unit dosage form, a member selected from the group consisting of the free base and pharmacologically acceptable acid addition salt form of a compound of the formula:

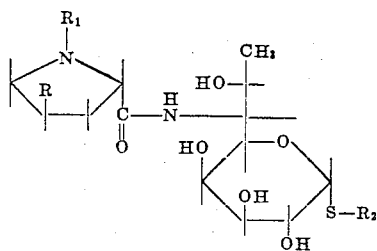

wherein R is alkyl of four, five, or six carbon atoms, $R_1$ is methyl or ethyl, and $R_2$ is methyl or ethyl in combination with a pharmaceutical carrier. Further, the invention relates to a process for the therapeutic treatment of humans and animals hosting bacterial infestations and the prophylactic treatment of a disease-susceptible host comprising the administration of a compound of the Formula I in the form of the free base or a pharmacologically acceptable acid salt to the host.

DETAILED DESCRIPTION

The compositions of the present invention are useful in the same manner as lincomycin in the treatment of humans and animals for various pathological conditions. The compositions provide a means for administering the therapeutic ingredient by the oral and parenteral routes for systemic treatment as well as topical and localized treatment. The compositions provide a method of therapy for tonsillitis, pneumonia, otitis, conjunctivitis, boils, carbuncles and other infectious conditions of humans due to the presence of bacteria known to be susceptible to lincomycin. In animals the compositions can be used prophylactically. For example, rats can be protected from *Streptococcus viridans* during shipment. Animals raised for meat can be given prophylactic treatment for increased weight gains. Further, chickens infected with PPLO (pleuropnemonialike organisms) can be treated.

The compounds of the formula I have unexpectedly exhibited up to 4 times greater activity against those gram positive organisms which are inhibited by lincomycin, that is to say, the compounds of the formula I show a greater inhibition than an equivalent amount (concentration) of lincomycin. Additionally, the compounds of the formula I show 8 times or more inhibition against gram negative organisms.

The active compounds of the present invention, compounds of the formula I, in the form of the free base or the pharmacologically acceptable acid addition salts can be prepared as shown in detail in copending application Ser. No. 387,776, filed Aug. 4, 1964, and Ser. No. 463,934, filed June 14, 1965.

The compositions of the present invention are preferably presented for administration to humans and animals in unit dosage forms, such as tablets, capsules, pills, powders, granules, sterile parenteral solutions or suspensions, and oral solutions or suspensions, and oil-water emulsions containing suitable quantities of a compound of the formula I in the form of the free base, or its pharmacologically acceptable salts.

For oral administration either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. The tablets can be laminated or otherwise compounded to provide a dosage form affording the advantage of prolonged or delayed action or predetermined successive action of the enclosed medication. For example, the tablet can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixture of polymeric acids with such materials as shellac, cetyl alcohol, cellulose acetate phthalate, styrene maleic acid copolymer and the like. Alternatively, the two component system can be utilized for preparing tablets containing two or more incompatible active ingredients. Wafers are prepared in the same manner as tablets, differing only in shape and the inclusion of sucrose or other sweetener and flavor. In their simplest embodiment, capsules, like tablets, are prepared by mixing the compound of the formulation with an inert pharmaceutical diluent and filling the mixture into a hard gelatin capsule of appropriate size. In another embodiment, capsules are prepared by filling hard gelatin capsules with polymeric acid coated beads containing the compound of the formula I. Soft gelatin capsules are prepared by machine encapsulation of a slurry of the compound of the formula I with an acceptable vegetable oil, light liquid petrolatum or other inert oil.

Fluid unit dosage forms for oral administration such as syrups, elixirs, and suspensions can be prepared. The water-soluble forms of the compound of the formula I can be dissolved in an aqueous vehicle together with sugar, aromatic flavoring agents and preservatives to form a syrup. An elixir is prepared by using a hydroalcoholic (ethanol) vehicle with suitable sweeteners such as sucrose together with an aromatic flavoring agent. Suspensions can be prepared of the insoluble forms with a syrup vehicle with the aid of a suspending agent such as acacia, tragacanth, methylcellulose and the like.

Topical ointments can be prepared by dispersing a compound of the formula I in a suitable ointment base such as petrolatum, lanolin, polyethylene glycols, mixtures thereof, and the like. Advantageously, the compound is finely divided by means of a colloid mill utilizing light liquid petrolatum as a levigating agent prior to dispersing in the ointment base. Topical creams and lotions are prepared by dispersing the compound in the oil phase prior to the emulsification of the oil phase in water.

For parenteral administration, fluid unit dosage forms are prepared utilizing a compound of the formula I and a sterile vehicle, water being preferred. The compound, depending on the form and concentration used, can be either suspended or dissolved in the vehicle. In preparing solutions a water-soluble form of the compound of formula I can be dissolved in water for injection and filter sterilized before filling into a suitable vial or ampule and sealing. Advantageously adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, troches, suppositories, powder packets, granules, wafers, cachets, teaspoonfuls, tablespoonfuls, dropperfuls, amuples, vials, segregated multiples of any of the foregoing, and other forms as herein described.

In addition to the administration of a compound of the formula I as the principal active ingredient of compositions for the treatment of the conditions described herein, the said compound can be included with other types of compounds to obtain advantageous combinations of properties. Such combinations include a compound of the formula I with antibiotics such as actinospectacin, chloramphenicol, tetracyclines (e.g., tetracycline, oxytetracycline and chlortetracycline), penicillin, erythromycin, novobiocin, kanamycin, streptomycin, neomycin, polymyxin, bacitracin, nystatin, filipin, fumagillin and endomycin to broaden the bacterial spectrum of the composition and for synergistic action against particular bacteria; steroid having anti-inflammatory activity such as hydrocortisone, prednisolone, 6α-methylprednisolone, 6α-fluoroprednisolone and the like; analgesics such as aspirin, sodium salicylate, (acetylsalicylic acid)-anhydride, N-acetyl-p-aminophenol and salicylamide; antihistamines, such as chlorpheniramine maleate, di-phenhydramine, promethazine, pyrathiazine, and the like; sulfas, such as sulfadiazine, sulfamethazine, sulfamerazine, sulfacetamide, sulfadimethyloxazole, sulfamethizole, and the like; antifungals, such as undecylenic acid, sodium propionate, salicylanilide, sodium caprylate, and hexetidine; and the vitamins.

The dosage of a compound of the formula I for treatment depends on route of administration; the age, weight, and condition of the patient; and the particular disease to be treated. A dosage schedule of from about 15 to 500 mg., 1 to 4 times daily (every six hours), embraces the effective range for the treatment of most conditions for which the compositions are effective. For children the dosage is calculated on the basis of 15 to 30 mg./kg./day to be administered every six hours.

The compound of the formula I is compounded with a suitable pharmaceutical carrier in unit dosage form for convenient and effective administration. In the preferred embodiments of this invention, the dosage units contain the compound in: 15, 30, 50, 100, 200 and 500 mg. amounts for systemic treatment; in 0.25, 0.5, 1, 2 and 5 percent amounts for topical or localized treatment; and 5 to 50% w/v for parenteral treatment. The dosage of compositions containing the compound of the formula I and one or more other active ingredients is to be determined with reference to the usual dosage of each such ingredient.

The following examples are illustrative of the best mode contemplated by the inventors for carrying out their invention and are not to be construed as limiting.

EXAMPLE 1 CAPSULES

One thousand two-piece hard gelatin capsules for oral use, each containing 200 mg. of methyl N-(trans-4-butyl-1-methyl-L-prolyl)-α-thiolincosaminide hydrochloride are prepared from the following types and amounts of materials:

| | |
|---|---|
| Methyl N-(trans-4-butyl-1-methyl-L-prolyl)-α-thiolincosaminide hydrochloride | 200 gm. |
| Corn starch | 150 gm. |
| Talc | 75 gm. |
| Magnesium stearate | 25 gm. |

The materials are thoroughly mixed and then encapsulated in the usual manner.

The foregoing capsules are useful for the systemic treatment of infection in adult humans by the oral administration of 1 capsule every 4 hours.

Using the procedure above, capsules are similarly prepared containing methyl N-(trans-4-butyl-1-methyl-L-prolyl)-α-thio-lincosaminide hydrochloride in 15, 30, 50, 100, and 500 mg. amounts by substituting 15, 30, 50, 100 and 500 gm. of methyl N-(trans-4-1-methyl-L-prolyl)-α-thiolincosaminide hydrochloride for the 200 gm. used above.

EXAMPLE 2 CAPSULES

One thousand two-piece hard gelatin capsules for oral use, each containing 200 mg. of methyl N-(trans-4-butyl-1-methyl-L-prolyl)-α-thiolincosaminide hydrochloride and 250 mg. of tetracycline hydrochloride, are prepared from the following types and amounts of ingredients:

| | |
|---|---|
| Methyl N-(trans-4-butyl-1-methyl-L-proplyl)-α-thiolincosaminide hydrochloride | 200 gm. |
| Tetracycline hydrochloride | 250 gm. |
| Talc | 75 gm. |
| Magnesium stearate | 25 gm. |

The ingredients are thoroughly mixed and then encapsulated in the usual manner.

The foregoing capsules are useful for the systemic treatment of infection in adult humans by the oral administration of 1 capsule every 6 hours.

Using the procedure above, capsules are similarly prepared containing methyl N-(trans-4-butyl-1-methyl-L-prolyl)-α-thiolincosaminide hydrochloride and each of the following antibiotics in place of tetracycline by substituting 250 gm. of such other antibiotic for tetracycline: chloramphenicol, oxytetracycline, chlortetracycline, fumagillin, erythromycin, streptomycin, dihydrostreptomycin and novobiocin. When a penicillin, such as potassium penicillin G, is to be used in place of tetracycline, 250,000 units per capsule is employed.

Such combination products are useful for the systemic treatment of mixed infections in adult humans by the oral administration of 1 capsule every 6 hours.

EXAMPLE 3 TABLETS

One thousand tablets for oral use, each containing 500 mg. of methyl N-(trans-4-butyl-1-methyl-L-prolyl)-α-thiolincosaminide hydrochloride are prepared from the following types and amounts of materials:

| | |
|---|---|
| Methyl N-(trans-4-butyl-1-methyl-L-prolyl)-α-thiolincosaminide hydrochloride | 500 gm. |
| Lactose | 125 gm. |
| Corn starch | 65 gm. |
| Magnesium stearate | 25 gm. |
| Light liquid petrolatum | 3 gm. |

The ingredients are thoroughly mixed and slugged. The slugs are broken down by forcing through a number sixteen screen. The resulting granules are then compressed into tablets, each tablet containing 500 mg. of methyl N-(trans-4-butyl-1-methyl-L-prolyl)-α-thiolincosaminide hydrochloride.

The foregoing tablets are useful for systemic treatment of infections in adult humans by oral administration of 1 tablet every 4 hours.

Using the above procedure, except for reducing the amount of methyl N-(trans-4-butyl-1-methyl-L-prolyl)-α-thiolincosaminide hydrochloride to 200 gm., tablets containing 200 mg. of methyl N-(trans-4-butyl-1-methyl-L-prolyl)-α-thiolincosaminide hydrochloride are prepared.

EXAMPLE 4 TABLETS

One thousand oral tablets, each containing 200 mg. of methyl N-(trans-4-butyl-1-methyl-L-prolyl)-α-thiolincosaminide hydrochloride and a total of 250 mg. (83.3 mg. each) of sulfadiazine, sulfamerazine, and sulfamethazine, are prepared from the following types and amounts of materials:

| | |
|---|---|
| Methyl N-(trans-4-butyl-1-methyl-L-prolyl)-α-thiolincosaminide hydrochloride | 200 gm. |
| Sulfadiazine | 83.3 gm. |
| Sulfamerazine | 83.3 gm. |
| Sulfamethazine | 83.3 gm. |
| Lactose | 50 gm. |
| Corn starch | 50 gm. |
| Calcium stearate | 25 gm. |
| Light liquid petrolatum | 5 gm. |

The ingredients are thoroughly mixed and slugged. The slugs are broken down by forcing through a number 16 screen. The resulting granules are then compressed into tablets, each containing 200 mgs. of methyl N-(trans-4-butyl-1-methyl-L-prolyl)-α-thiolincosaminide hydrochloride and a total of 250 mg. (83.3 mg. each) of sulfadiazine, sulfamerazine, and sulfamethazine.

The foregoing tablets are useful for systemic treatment of infections by the oral administration of 4 tablets first and then 1 every 6 hours.

For the treatment of urinary infections, the triple sulfas in the above formulation is advantageously replaced by 250 gm. of sulfamethylthiadiazole or 250 gm. of sulfacetamide.

EXAMPLE 5 GRANULES 2367 gm. of a granulation suitable for reconstitution with water prior to use is prepared from the following types and amounts of ingredients:

| | |
|---|---|
| Methyl N-(trans-4-butyl-1-methyl-L-prolyl)-α-thiolincosaminide hydrochloride | 150 gm. |
| Tetracycline hydrochloride | 150 gm. |
| Lecithin | 5 gm. |
| Sucrose, powdered | 2000 gm. |
| Flavor | 60 gm. |
| Sodium metabisulfite | 2 gm. |

The tetracycline is finely divided and coated with the lecithin. The coated tetracycline, methyl N-(trans-4-butyl-1-methyl-L-prolyl)-α-thiolincosaminide hydrochloride, sugar, flavor, and sodium metabisulfite are mixed together until thoroughly blended. The powder mixture is wetted with water and forced through a screen to form granules. The granules are dried and 23.67 gm. filled into 60 cc. bottles. Prior to use sufficient water is added to the granules to make 60 cc. of composition.

The foregoing composition is useful for systemic treatment of infection, particularly in children at a dose of one teaspoonful 4 times daily.

EXAMPLE 6 ORAL SYRUP

One thousand cc. of an aqueous suspension for oral use, containing in each 5 cc. dose, one-half gram of total sulfas and 200 mg. of methyl N-(trans-4-butyl-1-methyl-L-prolyl)-α-thiolincosaminide, is prepared from the following types and amounts of ingrdients:

| | |
|---|---|
| Methyl N-(trans-4-butyl-1-methyl-L-prolyl)-α-thiolincosaminide | 40 gm. |
| Sulfadiazine | 33.3 gm. |
| Sulfamerazine | 33.3 gm. |
| Sulfamethazine | 33.3 gm. |
| Citric acid | 2 gm. |
| Benzoic acid | 1 gm. |
| Sucrose | 700 gm. |

| | |
|---|---|
| Tragacanth | 5 gm. |
| Lemon oil | 2 cc. |
| Deionized water, q.s. | 1000 cc. |

The citric acid, benzoic acid, sucrose, tragacanth, and lemon oil are dispersed in sufficient water to make 850 cc. of solution. The methyl N-(trans-4-butyl-1-methyl-L-prolyl)-α-thiolincosaminide and finely powdered sulfas are stirred into the syrup until uniformly distributed. Sufficient water is added to make 1000 cc.

The composition so prepared is useful in the systemic treatment of pneumonia in adult humans at a dose of 1 teaspoonful 4 times a day.

EXAMPLE 7 PARENTERAL SOLUTION

A sterile aqueous solution for intramuscular use, containing in 1 cc. 200 mg. of methyl N-(trans-4-butyl-1-methyl-L-prolyl)-α-thiolincosaminide hydrochloride is prepared from the following types and amounts of materials:

| | |
|---|---|
| Methyl N-(trans-4-butyl-1-methyl-L-prolyl)-α-thiolincosaminide hydrochloride | 200 gm. |
| Lidocaine hydrochloride | 4 gm. |
| Methylparaben | 2.5 gm. |
| Propylparaben | 0.17 gm. |
| Water for injection, q.s. | 1000 cc. |

The ingredients are dissolved in the water and the solution sterilized by filtration. The sterile solution is filled into vials and the vials sealed.

EXAMPLE 8 PARENTERAL SOLUTION

A sterile aqueous solution for intramuscular use, containing in 1 cc. 50 mg. of methyl N-(trans-4-butyl-1-methyl-L-prolyl)-α-thiolincosaminide hydrochloride, is prepared from the following types and amounts of ingredients:

| | |
|---|---|
| Methyl N-(trans-4-butyl-1-methyl-L-prolyl)-α-thiolincosaminide hydrochloride | 50 gm. |
| Lactose | 50 gm. |
| Water for injection, q.s. | 1000 cc. |

The methyl N-(trans-4-butyl-1-methyl-L-prolyl)-α-thiolin-cosaminide salt and lactose are dissolved in the water and the solution sterilized by filtration. The sterile solution, in the amount of 2 cc., is aseptically filled into sterile vials and frozen. The water is removed under high vacuum and the vials containing the lyophilized powder are sealed. Just prior to use, sufficient sterile water for injection to make 2 cc. of solution is added to the vial.

EXAMPLE 9 TOPICAL OINTMENT

One thousand gm. of 0.25% ointment is prepared from the following types and amounts of ingredients:

| | |
|---|---|
| Methyl N-(trans-4-butyl-1-methyl-L-prolyl)-α-thiolincosaminide | 2.5 gm. |
| Zinc oxide | 50 gm. |
| Calamine | 50 gm. |
| Liquid petrolatum (heavy) | 250 gm. |
| Wool fat | 200 gm. |
| White petrolatum, q.s. | 1000 gm. |

The white petrolatum and wool fat are melted and 100 gm. of liquid petrolatum added thereto. The methyl N-(trans-4-butyl-1-methyl-L-prolyl)-α-thiolincosaminide, zinc oxide and calamine are added to the remaining liquid petrolatum and the mixture milled until the powders are finely divided and uniformly dispersed. The powder mixture is stirred into the white petrolatum mixture and stirring continued until the ointment congeals.

The foregoing ointment is usefully applied topically to the skin of mammals for the treatment of infection.

The foregoing composition can be prepared by omitting the zinc oxide and calamine.

Following the procedure above, ointments are similarly prepared containing methyl N-(trans-4-butyl-1-methyl-L-prolyl)-α-thiolincosaminide in 0.25, 0.5, 1, 2 and 5 percent amounts by substituting 0.25, 5, 10, 20 and 50 gm. of methyl N-(trans-4-butyl-1-methyl-L-prolyl)-α-thiolincosaminide for the 2.5 gm. used above.

EXAMPLE 10 CREAM

One thousand gm. of a vaginal cream are prepared from the following types and amounts of ingredients:

| | |
|---|---|
| Methyl N-(trans-4-butyl-1-methyl-L-prolyl)-α-thiolincosaminide | 50 gm. |
| Tegacid Regular[1] | 150 gm. |
| Spermaceti | 100 gm. |
| Propylene glycol | 50 gm. |
| Polysorbate 80 | 5 gm. |
| Methylparaben | 1 gm. |
| Deionized water, q.s. | 1000 gm. |

[1]Self-emulsifying glyceryl monostearate from Goldschmidt Chemical Corporation, New York, N.Y.

The Tegacid and spermaceti are melted together at a temperature of 70°–80° C. The methylparaben is dissolved in about 500 gm. of water and the propylene glycol, Polysorbate 80, and methyl N-(trans-4-butyl-1-methyl-L-prolyl)-α-thiolincosaminide are added in turn, maintaining a temperature of 75°–80° C. The methylparaben mixture is added slowly to the Tegacid and spermaceti melt, with constant stirring. The addition is continued for at least 30 minutes with continued stirring until the temperature has dropped to 40°–45° C. The pH of the final cream is adjusted to 3.5 by incorporating 2.5 gm. of citric acid and 0.2 gm. of dibasic sodium phosphate dissolved in about 50 gm. of water. Finally, sufficient water is added to bring the final weight to 1,000 gm. and the preparation stirred to maintain homogeneity until cooled and congealed.

The foregoing composition is useful for the treatment of vaginal infections in humans.

EXAMPLE 11 OINTMENT, OPHTHALMIC

One thousand gm. of an ophthalmic ointment containing 0.5 percent methyl N-(trans-4-butyl-1-methyl-L-prolyl)-α-thiolincosaminide hydrochloride are prepared from the following types and amounts of ingredients:

| | |
|---|---|
| Methyl N-(trans-4-butyl-1-methyl-L-prolyl)-α-thiolincosaminide hydrochloride | 5 gm. |
| Bacitracin (40 units/mg. ) | 12.2 gm. |
| Polymyxin B sulfate (10,000 units/mg.) | 1 gm. |
| Light liquid petrolatum | 250 gm. |
| Wool fat | 200 gm. |
| White petrolatum, q.s. | 1000 gm. |

The solid ingredients are finely divided by means of an air micronizer and added to the light liquid petrolatum. The mixture is passed through a colloid mill to uniformly distribute the micronized particles. The wool fat and white petrolatum are melted together, strained, and the temperature adjusted to 45°–50° C. The liquid petrolatum slurry is added and the ointment stirred until congealed. Suitably the ointment is packaged in one dram ophthalmic tubes.

The foregoing ointment is usefully applied to the eye for treatment of localized infection in humans and other animals.

Advantageously the foregoing composition can contain 5 gm. (0.5 percent) of methylprednisolone for the treatment of inflammation, and, alternatively, the bacitracin and polymyxin B sulfate can be omitted.

EXAMPLE 12 EYE-EAR DROPS

One thousand cc. of a sterile aqueous solution for eye or ear use containing 10 mg. of methyl N-(trans-4-butyl-1-methyl-L-prolyl)-α-thiolincosaminide and 10 mg. of prednisolone in each cc. is prepared from the following types and amounts of ingredients:

| | |
|---|---|
| Methyl N-(trans-4-butyl-1-methyl-L-prolyl)-α-thiolincosaminide hydrochloride | 10 gm. |
| Prednisolone succinate sodium | 10 gm. |
| Sodium citrate | 4.5 gm. |
| Polyethylene glycol 4000 | 120 gm. |
| Myristyl-γ-picolinium chloride | 0.2 gm. |
| Polyvinylpyrrolidone | 1 gm. |
| Deionized water, q.s. ad | 1000 cc. |

The ingredients are dissolved in the water and the resulting solution is sterilized by filtration. The solution is aseptically filled into sterile dropper containers.

The composition so prepared is useful in the topical treatment of inflammation and infection of the eye and ear as well as other sensitive tissues of the animal body.

EXAMPLE 13 TROCHES

Ten thousand troches are prepared from the following types and amounts of ingredients:

| | |
|---|---|
| Methyl N-(trans-4-butyl-1-methyl-L-prolyl)-α-thiolincosaminide hydrochloride | 100 gm. |
| Neomycin sulfate | 50 gm. |
| Polymyxin B sulfate (10,000 units/mg.) | 1 gm. |
| Ethyl aminobenzoate | 50 gm. |
| Calcium stearate | 150 gm. |
| Powdered sucrose, q.s. | 5000 gm. |

The powdered materials are mixed thoroughly and then compressed into half gram troches following the usual techniques for the preparation of compressed tablets.

The troches are held in the mouth and allowed to dissolve slowly to provide treatment for the mouth and throat of humans.

EXAMPLE 14 CHEWING GUM

Pieces of uncoated chicle chewing gum of tablet-like shape weighing about one gram each are used as starters for the coating process. A coating of sucrose is first applied, using a syrup (80 percent sucrose solution) and the usual coating pan. A finely powdered highly hydrogenated castor oil, such as Thixcin, is dusted on the sucrose-covered starters. The second coating step is the application of a dispersion of methyl N-(trans-4-butyl-1-methyl-L-prolyl)-α-thiolincosaminide hydrochloride and benzocaine (10:1) in absolute ethanol. Successive applications are made until 50 mg. of methyl N-(trans-4-butyl-1-methyl-L-prolyl)-α-thio-lincosaminide hydrochloride and 5 mg. of benzocaine have been deposited on each piece. Thereafter, a second dusting of the hydrogenated castor oil is applied. A final finishing coating is applied of sucrose solution containing flavor and color. Advantageously a polishing coat of wax is added.

The foregoing chewing gum composition is chewed in the mouth to provide the slow release of methyl N-(trans-4-butyl-1-methyl-L-prolyl)-α-thiolincosaminide for the topical treatment of infections of the mouth and throat.

EXAMPLE 15 SUPPOSITORY, RECTAL

One thousand suppositories, each weighing 2.5 gm. and containing 100 mg. of methyl N-(trans-4-butyl-1-methyl-L-prolyl)-α-thiolincosaminide hydrochloride are prepared from the following types and amounts of ingredients:

| | |
|---|---|
| Methyl N-(trans-4-butyl-1-methyl-L-prolyl)-α-thiolincosaminide hydrochloride | 100 gm. |
| Polymyxin B sulfate (10,000 units/mg.) | 1.25 gm. |
| 6α-methylprednisolone | 1 gm. |
| Ethyl aminobenzoate | 75 gm. |
| Zinc oxide | 62.5 gm. |
| Propylene glycol | 162.5 gm. |
| Polyethylene glycol 4000 q.s. | 2500 gm. |

The methyl N-(trans-4-butyl-1-methyl-L-prolyl)-α-thiolincosaminide hydrochloride, polymyxin B sulfate, 6α-methylprednisolone, ethyl aminobenzoate, and zinc oxide are added to the propylene glycol and the mixture milled until the powders are finely divided and uniformly dispersed. The polyethylene glycol 4,000 is melted and the propylene glycol dispersion added slowly with stirring. The suspension is poured into unchilled molds at 40° C. The composition is allowed to cool and solidify and then removed from the mold and each suppository foil wrapped.

The foregoing suppositories are inserted rectally for local treatment of inflammation and infection.

Alternatively, the foregoing composition can be prepared omitting the steroid.

EXAMPLE 16 MASTITIS OINTMENT

One thousand gm. of an ointment for the treatment of mastitis in dairy cattle is prepared from the following types and amounts of ingredients:

| | |
|---|---|
| Methyl N-(trans-4-butyl-1-methyl-L-prolyl)-α-thiolincosaminide hydrochloride | 50 gm. |
| Prednisolone acetate | 0.5 gm. |
| Light liquid petrolatum | 300 gm. |
| Chlorobutanol, anhydrous | 5 gm. |
| Polysorbate 80 | 5 gm. |
| 2% Aluminum monostearate-peanut oil gel | 400 gm. |
| White petrolatum, q.s. | 1000 gm. |

The methyl N-(trans-4-butyl-1-methyl-L-prolyl)-α-thiolincosaminide hydrochloride and prednisolone acetate are milled with the light liquid petrolatum until finely divided and uniformly dispersed. The chlorobutanol, polysorbate 80, peanut oil gel and white petrolatum are heated to 120° F. to form a melt and the liquid petrolatum dispersion stirred in. With continued stirring the dispersion is allowed to cool (and congeal) to room temperature and is filled into disposable mastitis syringes in 10 gm. doses.

EXAMPLE 17 ANIMAL FEED

One thousand gm. of a feed mix is prepared from the following types and amounts of ingredients:

| | |
|---|---|
| Methyl N-(trans-4-butyl-1-methyl-L-prolyl)-α-thiolincosaminide hydrochloride | 10 gm. |
| Soybean meal | 400 gm. |
| Fish meal | 400 gm. |

| | |
|---|---|
| Wheat germ oil | 50 gm. |
| Sorghum molasses | 140 gm. |

The ingredients are mixed together and pressed into pellets.

The composition can be fed to laboratory animals, i.e., rats, mice, guinea pigs, and rabbits for prophylaxis during shipping.

For other animals such as poultry, e.g., chickens, ducks, turkeys, and geese, the composition can be added to the animal's regular feed in an amount calculated to give the desired dose of methyl N-(trans-4-butyl-1-methyl-L-prolyl)-α-thiolincosaminide.

EXAMPLE 18

Following the procedure of each of the preceding Examples 1 through 17, each member selected from the group consisting of ethyl N-(trans-4-butyl-1-methyl-L-prolyl)-α-thiolincosaminide; methyl N-(trans-4-pentyl-1-methyl-L-prolyl)-α-thiolincosaminide; ethyl N-(trans-4-pentyl-1-methyl-L-prolyl)-α-thiolincosaminide; methyl N-(trans-4-hexyl-1-methyl-L-prolyl)-α-thiolincosaminide; ethyl N-(trans-4-hexyl-1-methyl-L-prolyl)-α-thiolincosaminide; methyl N-(trans-4-hexyl-1-ethyl-L-prolyl)-α-thiolincosaminide; ethyl N-(trans-4-hexyl-1-ethyl-L-prolyl)-α-thiolincosaminide; methyl N-(trans-4-butyl-1-ethyl-L-prolyl)-α-thiolincosaminide; ethyl N-(trans-4-butyl-1-ethyl-L-prolyl)-α-thiolincosaminide; methyl N-(trans-4-pentyl-1-ethyl-L-prolyl)-α-thiolincosaminide; ethyl N-(trans-4-pentyl-1-ethyl-L-prolyl)-α-thiolincosaminide is substituted in an equivalent amount for the methyl N-(trans-4-butyl-1-methyl-L-prolyl)-α-thiolincosaminide hydrochloride shown in the example to provide similar therapeutic properties.

Similarly each of the above free base compounds can be used in the form of a pharmacologically acceptable acid addition salt, e.g., hydrochloride, sulfate, nitrate, phosphate, citrate, lactate, acetate, tartrate, and succinate.

EXAMPLE 19

Following the procedure for each of the preceding Examples 1 through 4, each member selected from the group consisting of sodium novobiocin, calcium novobiocin, chlortetracycline hydrochloride, oxytetracycline hydrochloride, tetracycline, tetracycline hydrochloride, and tetracycline phosphate complex is added in 50, 100 and 250 gm. amounts to provide a combination having a wider spectrum of therapeutic effectiveness in the treatment of infectious diseases resulting from mixed organisms susceptible to the compounds of the formula I as indicated in the present specification and the above indicated antibiotics as already well known to the medical art.

We claim:

1. A therapeutic antibacterial composition comprising, in unit dosage form, from about 15 to about 500 mg. of a member selected from the group consisting of the free base and pharmacologically acceptable acid addition salt forms of a compound of the formula:

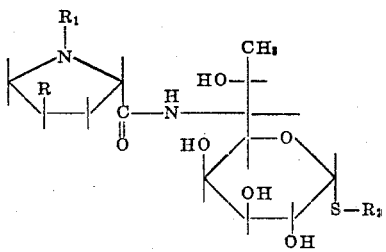

wherein R is alkyl of four, five, or six carbon atoms, $R_1$ is methyl or ethyl, and $R_2$ is methyl or ethyl in combination with a pharmaceutical carrier.

2. The composition of claim 1 suitable for parenteral administration wherein said pharmacological carrier is a sterile vehicle and said member is present in a concentrate of from about 5 to about 50 percent weight volume of the composition.

3. A process for treating a lincomycin susceptible bacterial disease in humans and animals which comprises the administering to the human or animal bacterial host as a therapeutic amount an antibacterially effective amount of a member selected from the group consisting of the free base and pharmacologically acceptable acid addition salt forms of a compound of the formula:

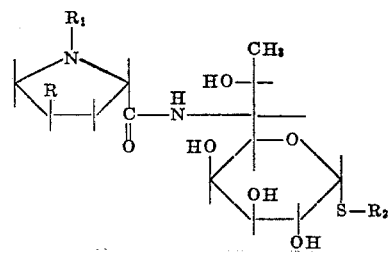

wherein R is a alkyl of four, five, or six carbon atoms, $R_1$ is methyl or ethyl, and $R_2$ is methyl or ethyl in combination with a pharmaceutical carrier.

4. The process of claim 3 wherein said member is administered in unit dosage form of from about 50 to about 500 mg. of said member.

5. A process of prophylactic treatment for the prevention of lincomycin susceptible bacterial disease comprising the administering as a prophylactic amount an antibacterially effective amount to a disease-susceptible human or animal host, a member selected from the group consisting of the free base and pharmacologically acceptable acid addition salt forms of a compound of the formula:

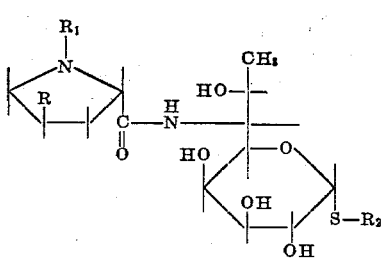

wherein R is alkyl of four, five, or six carbon atoms, $R_1$ is methyl or ethyl, and $R_2$ is methyl or ethyl in combination with a pharmaceutical carrier.

6. The process of claim 5 wherein said member is administered in unit dosage form of from about 50 to about 500 mg.

* * * * *